United States Patent [19]
Nagai

[11] Patent Number: 6,160,349
[45] Date of Patent: Dec. 12, 2000

[54] DISPLAY DEVICE

[75] Inventor: Takayoshi Nagai, Tokyo, Japan

[73] Assignee: Mitsubishi Denki Kabushiki Kaisha, Tokyo, Japan

[21] Appl. No.: 09/050,023

[22] Filed: Mar. 30, 1998

[30] Foreign Application Priority Data

Apr. 7, 1997 [JP] Japan .................................. 09-087991

[51] Int. Cl.[7] ...................................................... H01J 1/52
[52] U.S. Cl. ................................................. 315/85; 349/59
[58] Field of Search .............................. 315/85; 345/904, 345/905, 903; 349/59, 58, 138, 158

[56] References Cited

U.S. PATENT DOCUMENTS

| | | | |
|---|---|---|---|
| 4,845,402 | 7/1989 | Smith | 315/85 |
| 5,497,146 | 3/1996 | Hebiguchi | 345/904 |
| 5,815,224 | 9/1998 | Hasegawa et al. | 349/58 |
| 5,917,284 | 6/1999 | Moore et al. | 313/586 |
| 5,946,062 | 8/1999 | Hasegawa et al. | 349/59 |

FOREIGN PATENT DOCUMENTS

| | | | |
|---|---|---|---|
| 8222137 | 8/1996 | Japan | H01J 17/18 |
| 8222138 | 8/1996 | Japan | H01J 17/18 |
| 8314391 | 11/1996 | Japan | G04F 9/00 |
| 10 3280 | 1/1998 | Japan . | |
| 3038897 | 3/2000 | Japan . | |

*Primary Examiner*—Don Wong
*Assistant Examiner*—Thuy Vinh Tran

[57] ABSTRACT

A panel (10) and a drive circuit substrate (12) are disposed within a conductive shielding case (20). Between the panel (10) and the drive circuit substrate (12), a conductive holding board (16) or separately provided conductive material is provided, and connected to the conductive shielding case (20) by a connecting means (22) so as to surround the drive circuit substrate (12) to be the source of noise. This forms an electromagnetic shield for the drive circuit (12). Further, a conductive layer is formed on an upper part of an insulating film of a wiring board (25) which connects the panel (10) and the drive circuit substrate (12). The conductive layer may be connected to, for example, the conductive shielding case (20) and the holding board (16) to be forced to have a ground potential. This provides an electromagnetic shield to the wiring board (25) as well as preventing emission of noise from a gap between the panel (10) and the conductive shielding case (20).

16 Claims, 14 Drawing Sheets

CONNECTION PITCH

DISPLAY DEVICE

BACKGROUND OF THE INVENTION

1. Field of the Invention

The present invention is directed to a structure of a display device for preventing electromagnetic interference (EMI). The display device comprises a display panel with a plurality of pixels formed between substrates.

2. Background of the Invention

Many conventional display devices such as a plasma display device and others employ an electromagnetic shield as a measure against EMI so that an electromagnetic wave generated by the display devices would not have an undesirable effect on various adjacent control circuits or communication systems.

FIG. 16 shows a sectional structure of a display device 100 comprising such a display panel. One example of a display panel 10 (hereinafter referred to as a panel) is an AC type plasma display panel (PDP). As shown in FIG. 16, in order to electromagnetically shield the display device 100, the panel 10 and a drive circuit substrate 12 equipped with a drive circuit for driving the panel 10 are disposed within a conductive shielding case 20 made of metal. In the conductive shielding case 20, a holding board 15 is provided on a non-display surface side of the panel 10 (below the broken line in the figure), which is opposed to a display surface 10a, to hold the panel 10 made of a glass substrate or the like. The panel 10 and the drive circuit substrate 12 are connected by a wiring board 14 including signal wiring, such as a flexible printed circuit (FPC). The wiring board 14 is also deposited within the conductive shielding case 20.

If the conductive shielding case 20 totally covers the whole surfaces of the panel 10 and the drive circuit substrate 12 which is the biggest source of noise, a reliable electromagnetic shield becomes possible. In the display device as shown in FIG. 16, however, the conductive shielding case 20 does not cover the display surface of the panel 10 which is thus covered by a transparent or translucent conductive filter 18 to be electrically connected to the conductive shielding case 20. By surrounding the panel 10 and the drive circuit substrate 12 with the conductive shielding case 20 and the conductive filter 18, an electromagnetic noise emitted outside the display device 100 is excluded.

Employed as the conductive filter 18 for covering the display surface of the panel 10 is, for example, a glass or acrylic filter with a transparent conductive film, such as an indium tin oxide (ITO) film or a considerably thin silver evaporation film, formed on the internal or external surface thereof, or a filter with fine conducting wires formed lengthwise and crosswise with a small pitch, that is, a filter with a fine wire gauze laminated thereto.

Though conductive, the transparent conductive film such as an ITO has a higher electrical resistance compared to a metal material such as the conductive shielding case 20, thereby providing less shield effect. Thus, in order to reduce the electrical resistance and increase the shield effect, the transparent conductive film needs to be thicker. However, the increased film thickness of the transparent conductive film deteriorates transmittance of light. This reduces display brightness or contrast, thereby reducing display quality. Further, it takes time and increases manufacturing cost to form a thick transparent conductive film.

The fine wire gauze, on the other hand, causes low transmittance of light, and in some cases, generates moire' on the display surface side in relation to a dot pitch of each pixel of the panel 10. Thus, in this case, it is difficult to prevent deterioration in display quality.

SUMMARY OF THE INVENTION

A first aspect of the present invention is directed to a display device having a display panel with a plurality of pixels formed between a pair of substrates and giving a desired display by controlling each of the pixels. The display device comprises: a conductive shielding case with the display panel and a drive circuit for driving the display panel disposed therein, the conductive shielding case having an opening at the side of a display surface of the display panel; and a conductive member disposed between the drive circuit and the display panel. The drive circuit is disposed in the side of an non-display surface of the display panel formed within the conductive shielding case, and the conductive member and the conductive shielding case are connected to provide an electromagnetic shield to the drive circuit.

Preferably, according to a second aspect of the present invention, the display device of the first aspect further comprises a conductive portion having a ground potential; and a signal wire for electrically connecting the drive circuit and the display panel. The conductive portion and the signal wire make a static capacitance.

Preferably, according to a third aspect of the present invention, the display device of the second aspect further comprises an insulating layer formed on the signal wire; and a conductive layer formed on the insulating layer. The conductive layer is forced to have a ground potential.

Preferably, according to a fourth aspect of the present invention, the display device of the third aspect further comprises a connecting means for connecting the conductive layer to the conductive shielding case so that the conductive layer is forced to have a ground potential.

Preferably, according to a fifth aspect of the present invention, the display device of the second aspect further comprises insulating films covering top and bottom surfaces of the signal wire, respectively; and conductive layers formed on each of the insulating films. The conductive layers are forced to have a ground potential.

Preferably, according to a sixth aspect of the present invention, the display device of the second aspect further comprises insulating films covering top and bottom surfaces of the signal wire, respectively; and conductive layers formed on each of the insulating films. One of the conductive layers, disposed at the side of the conductive member disposed between the drive circuit and the display panel, is connected to the conductive member, while the other disposed at the side of the conductive shielding case is connected to the conductive shielding case.

Preferably, according to a seventh aspect of the present invention, the display device of the fifth or sixth aspect further comprises a variable-shape member having conductivity at least on the surface thereof and deposited at least between the conductive layer and the conductive shielding case. The conductive member and the conductive shielding case are electrically connected with the variable-shape member.

Preferably, according to an eighth aspect of the present invention, the display device according to either of the first to third aspects further comprises a noise filter inserted into paths of a power wire and a signal wire extracted from the drive circuit to the outside of the conductive shielding case; and an inductance component added to a grounded wiring path for electromagnetically shielding each of the power wire and the signal wire.

A ninth aspect of the present invention is directed to an AC type plasma display panel comprising: a pair of substrates; a plurality of discharge pixel cells formed between the pair of substrates; and a pair of sustain electrodes formed on one of the pair of substrates, to which sustain pulses are applied to control discharge at each of the plurality of discharge pixel cells so as to alternatively reverse polarity between the pair of sustain electrodes to make an instantaneous average voltage almost constant at the pair of sustain electrodes during a sustained discharge period for each of the discharge pixel cells.

Preferably, according to a tenth aspect of the present invention, the display device according to either of the first to ninth aspects further comprises a transparent conductive layer formed on a display surface of the display panel. The transparent conductive layer is connected to the conductive shielding case.

According to the present invention, the conductive shielding case, the conductive member, and the connecting means for connecting the conductive shielding case and the conductive member provide a reliable electromagnetic shield to the drive circuit. This makes it possible to omit an electromagnetic shielding member on the display surface side of the panel, thereby achieving an electromagnetic shield without deterioration in display quality.

Further, since the static capacitance is included between the signal wire and the conductive portion having a ground potential, it becomes possible to prevent noise generated at the drive circuit from being transmitted through the signal wire to the panel and leaked out from the display surface side of the panel.

Further, by forming the insulating layer on the signal wire and the conductive layer on the insulating film, and forcing the conductive layer to have a ground potential, it becomes possible to provide a static capacitance between the signal wire and the conductive portion having a ground potential without connecting the static capacitance element with every signal wire. This results in easy achievement of the circuit.

Further, if the conductive layer forming the static capacitance along with the signal wire is connected to the conductive shielding case by the connecting means, the conductive layer would certainly have a ground potential without floating electrically.

Moreover, if the conductive layers are formed on the insulating layers which cover the top and bottom surfaces of the signal wire, respectively, and they are connected, for example, to the conductive shielding case to apply a ground voltage, an emission of noise from the signal wire itself can be prevented.

Further, the top and bottom surfaces of the signal wire are covered by the insulating layers, respectively, on which a conductive layer is formed. Then, one of the conductive layers, disposed on the side of the conductive member formed between the drive circuit and the display panel is connected to the conductive member, while the other disposed on the side of the conductive shielding case is connected to the conductive shielding case. Thus, those conductive layers act as relay points of the connecting means. This reduces a gap on the shield surface surrounding the drive circuit, thereby improving shield effect.

If the conductive layers formed on the top and bottom surfaces of the signal wire are connected to, for example, the conductive shielding case by a variable-shape member, a gap on the shield surface of the driving circuit can be reduced. This prevents transmission of noise through the signal wire to the panel, and further certainly prevents emission of noise from the signal wire itself.

Further, according to the present invention, a noise filter is inserted into the paths of the power or signal wire, and an inductance component is provided into the path of the ground wire for electromagnetically shielding the power and signal wires. This certainly prevents emission of noise from antennas of the panel and the ground wire extending to the outside of the shield, even if the conductive shielding case fails to completely surround the display surface of the panel.

Moreover, by driving so as to make the instantaneous average voltage constant at the pair of sustain electrodes during the sustained discharge period, generation of noise itself can be reduced in the plasma display panel.

In addition to the above-described structure, if a transparent conductive layer is such thin or formed of such a material as not to affect the display quality, a more reliable electromagnetic shield can be achieved in the display device.

The object of the present invention is to provide a display device achieving a reliable electromagnetic shield without deterioration in display quality.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
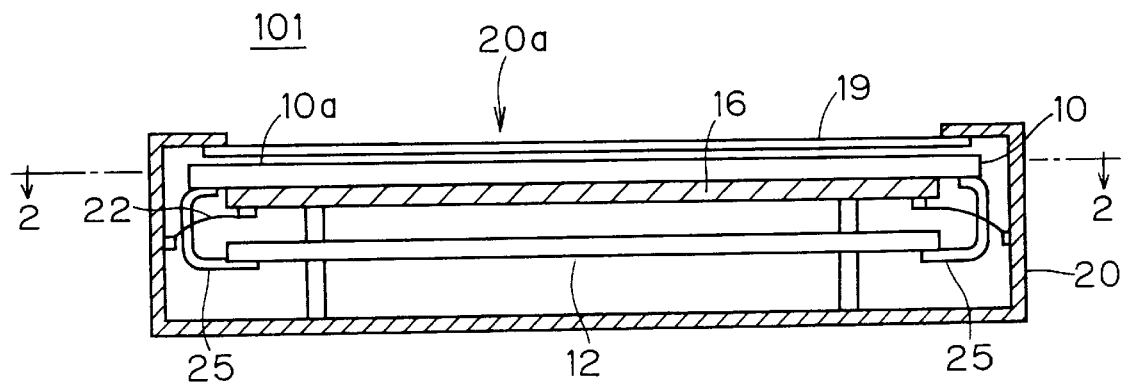
FIG. 1 is a sectional view roughly showing a structure of a display device according to a first preferred embodiment of the present invention.

FIG. 1 is a sectional view roughly showing a structure of a display device 101 according to a first preferred embodiment.

A panel 10 such as a PDP, and a drive circuit substrate 12 equipped with various drive circuits for driving the panel 10 are surrounded by a conductive shielding case 20 made of metal and having an opening 20a. The conductive shielding case 20 is grounded to have a ground voltage. A display surface 10a of the panel 10 faces the opening 20a. On the opposite surface side of the panel 10 to the display surface 10a (below a line 2—2 in the figure), a holding board 16 is disposed to hold the panel 10 which is made of a glass substrate or others. The drive circuit substrate 12, disposed below the holding board 16, is equipped with a part or all of various circuits, such as a high-voltage switching circuit for generating a driving signal of the PDP, a logic circuit having a control function or the like, a video signal processing circuit and a power circuit, as drive circuits.

The panel 10 and the drive circuit substrate 12 are connected by a wiring, substrate 25 using, for example, a FPC. The wiring substrate 25 is disposed within the conductive shielding case 20, and is partly bent so as to face the side surface of the conductive shielding case 20 (the surface almost perpendicular to the surface forming the opening 20a).

Figure 2:
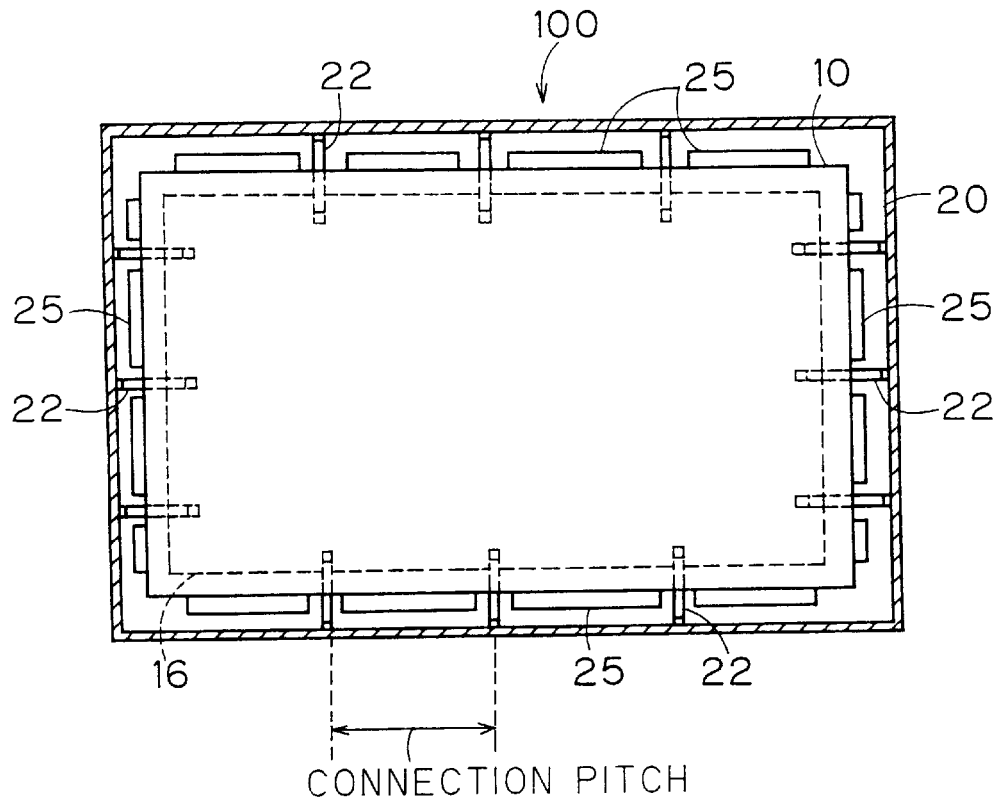
FIG. 2 is a sectional view taken along a line 2—2 in FIG. 1.

For the above holding board 16, a conductive member such as a metal material (Aluminum, for example) is used. FIG. 2 is a sectional view taken along a line 2—2 in FIG. 1. A connecting means 22 is formed in a gap between a plurality of wiring boards 25 to electrically connect the holding board 16 and the conductive shielding case 20.

As described above, the holding board 16 made of a conductive member is disposed between the panel 10 and the drive circuit substrate 12, and the connecting means 22 connects the holding board 16 to the conductive shielding case 20. As a result, the conductive shielding case 20, the holding board 16 and the connecting means 22 surround the drive circuit substrate 12 to be a source of noise to form an electromagnetic shield for the drive circuit substrate 12.

A connection pitch between the respective connecting means 22 is preferably as short as possible. To be concrete, it is desirable to make the pitch less than one sixth of a wavelength λ of a frequency band which is one of problems with a measure against the EMI. For the connecting means 22, for example, a covered lead wire or reticulated lead wire, or various conductive materials such as a contact finger or metal board, can be used. The connecting means 22 may be connected with each of the holding board 16 and the conductive shielding case 20 by means of solder, weld, or fixation with a rivet or screw, as long as nothing causes obstruction to the electrical conductivity thereof.

In the structure shown in FIG. 1, a transparent conductive film 19 made of, for example, an ITO is provided at the side of the display surface 10a of the panel 10. In this preferred embodiment, the transparent conductive film 19 is not always necessary. However, by forming the transparent conductive film 19, which is relatively thin so as not to affect picture quality, at the opening 20a facing the display surface 10a and connecting the film 19 to the conductive shielding case 20, a reliable electromagnetic shield can be provided against even a relatively feeble electromagnetic wave leaked out from the display surface 10a of the panel 10. The same applied to the following preferred embodiments.

Although the holding board 16 is used as a conductive member to be provided between the panel 10 and the drive circuit substrate 12 in the foregoing description, the conductive member does not necessarily have a holding function of the panel 10 as long as provided between the panel 10 and the drive circuit substrate 12. If the holding board 16 is not a conductive member, a metal board or metal film such as an Aluminum foil, or a conductive member such as a sheeted glass or mylar sheet involving a metal deposition, needs to be formed between the panel 10 and the drive circuit substrate 12. Alternatively, a metal deposition film may be formed on the panel 10 on the opposite surface side to the display surface 10a, or a conductive resign may be coated thereon.

As to noise leaking outside through a power or signal wire extracted from the display device 100 to the outside of the conductive shielding case 20 in FIG. 1, a noise filter such as an LCR circuit is provided at each input and output portion of the wire to shut off the noise (cf. a noise filter 42 in FIG. 6 which will be described later).

2. Second Preferred Embodiment

In the first preferred embodiment, the drive circuit substrate 12 is electromagnetically shielded by the conductive member (holding board 16), the conductive shielding case 20, and the connecting means 22. In some cases, however, noise leaks from the drive circuit substrate 12 through the wiring substrate 25. When the display device has a VGA (video graphics array)-class resolution, for example, the number of signal wires for connecting the drive circuit substrate 12 to the panel 10 is [(640×3)+480)] or more. Thus, it is difficult to provide a noise filter using a LCR circuit for each of the signal wires.

Figure 3:
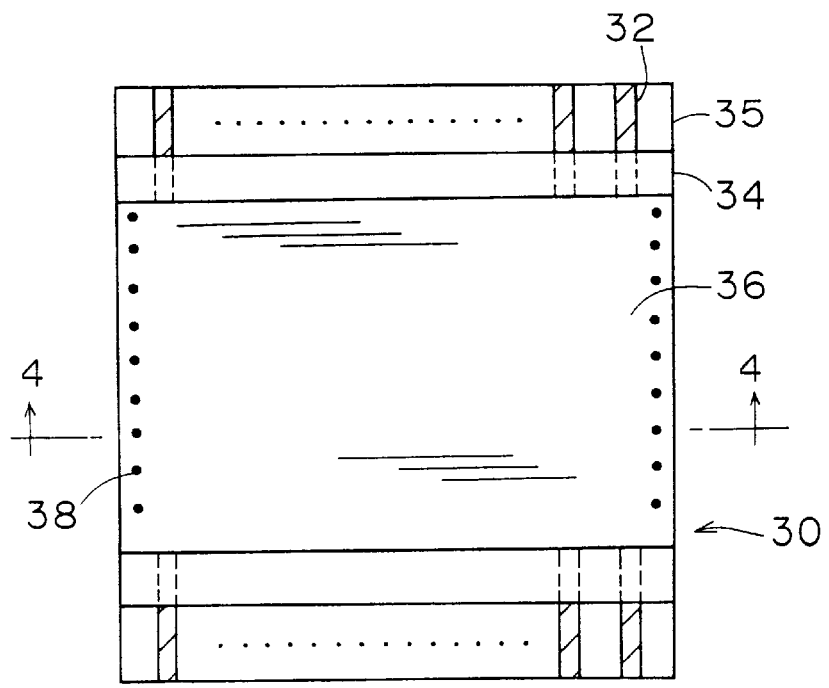
FIG. 3 shows a wiring board of the display device according to a second preferred embodiment of the present invention.
Figure 4:
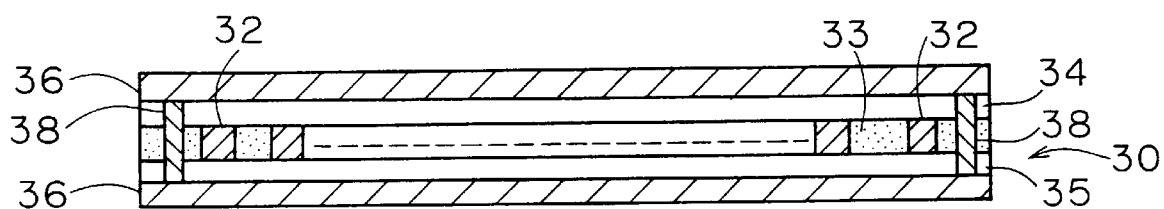
FIG. 4 shows a sectional structure of a FPC 30 taken along a line 4—4 in FIG. 3.

In the display device according to a second preferred embodiment, in order to further prevent the leakage of noise through the wiring substrate 25 in the structure as shown in FIGS. 1 and 2, a flexible printed circuit (FPC) 30 as shown in FIGS. 3 and 4 is employed as a wiring board. FIG. 3 roughly shows a plan structure of the FPC 30; FIG. 4 is a sectional view taken along a line 4—4 in FIG. 3; and FIG. 5 shows an equivalent circuit for the FPC 30 according to the second preferred embodiment.

In FIGS. 3 and 4, a signal wire 32 is formed on a substrate 35 composed of an insulating layer such as polyimide, and covered by an insulating layer 34 such as polyimide. Further, a conductive layer 36 is formed on the insulating layer 34. The conductive layer 36 is also formed on the bottom surface of the substrate 35 which is an insulating layer. Namely, the insulating layers 34 and 35 are formed on the top and bottom surfaces of the signal wire 32, respectively, and further the conductive layers 36 are formed on the respective insulating films. These two conductive layers 36 are electrically connected to each other at a via hole 38 formed at an edge portion of the substrate 35.

Figure 5:
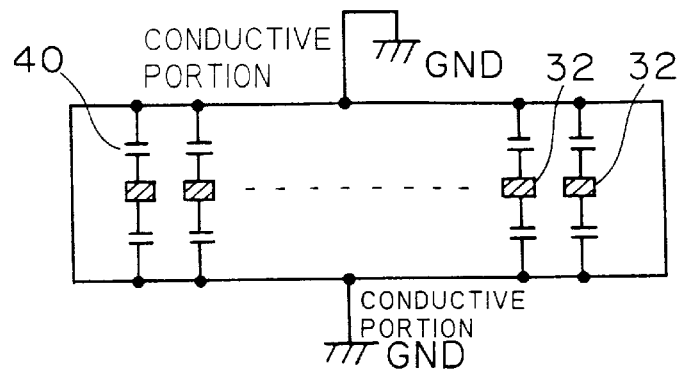
FIG. 5 shows an equivalent circuit of the FPC 30 according to the second preferred embodiment.

By forming a pair of conductive layers 36 so as to sandwich the insulating layer 34 and the substrate 35 disposed on the top and bottom surfaces of the signal wire 32, respectively, a static capacitance 40 is formed between the signal wires 32 and the conductive layers 36, respectively, as in the equivalent circuit shown in FIG. 5. The conductive layer 36 is, for example, electrically connected to the holding board 16 and the conductive shielding case 20) to have a ground potential. That is, the conductive layer 36 is forced to have a ground potential, so that the static capacitance 40 is provided between the respective signal wires 32 and the conductive portion having a ground potential.

Figure 6:
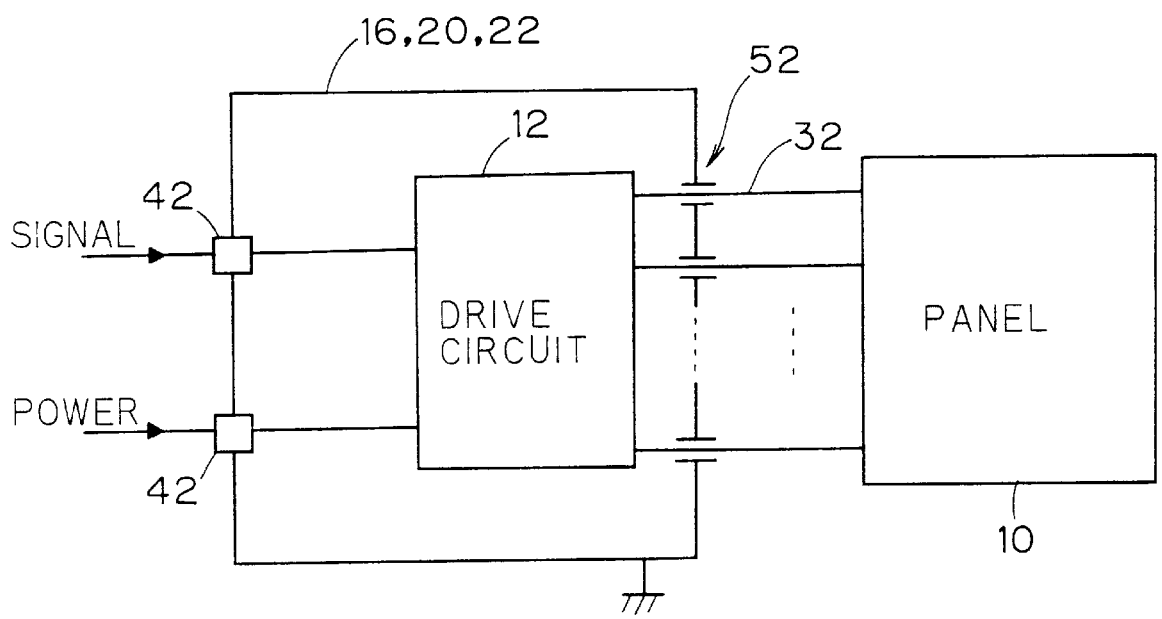
FIG. 6 shows a structure of the display device according to the second preferred embodiment.

With the FPC 30 having such a structure, the equivalent circuit for the display device 101 will be as shown in FIG. 6. Namely, an equivalent feed-through capacitor 52 is, as shown in FIG. 6, formed between the signal wire 32 connected to the panel 10 and a shield consisting of the conductive shielding case 20, the holding board 16, and the connecting means 22 which surround the drive circuit substrate 12 shown in FIGS. 1 and 2. Thus, an output impedance of the drive circuit and the equivalent feed-through capacitor 52 form a low path filter, by which a high-frequency noise component transmitted from the drive circuit substrate 12 to the panel 10 can be drained through the static capacitance 40 to ground.

Figure 7:
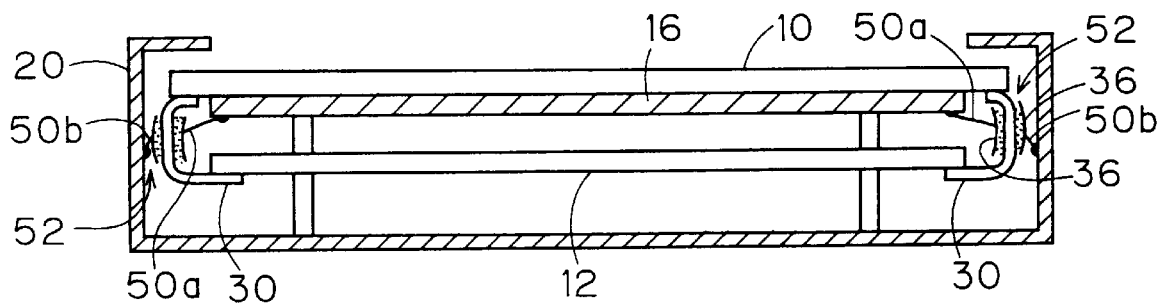
FIG. 7 is a sectional view roughly showing a structure of the display device according to the second preferred embodiment.

Further, as shown in FIG. 7, the conductive layer 36 formed in the FPC 30 may be used as a relay point of the connecting means 22 described in the first preferred embodiment. In this case, besides the connecting means 22 shown in FIG. 2, the holding board 16 and the conductive shielding case 20 are connected to each other, even where the wiring substrate 25 exists, by another connecting means 50d, 50b and the equivalent feed-through capacitor 52. This reduces a gap on the shield surface surrounding the drive circuit substrate 12, thereby improving shield effect. In such a case, it is possible to omit the connecting means 22 for directly connecting the holding board 16 and the conductive shielding case 20.

Further, provided in the FPC 30, the conductive layer 36 has a function to shield an electromagnetic wave emitted from the FPC 30 itself to the outside. This further improves shield effect.

For such a FPC 30, the following structures are, for example, applicable.

(a) There are two conductive material layers in the FPC: one is a signal wire 32 and the other is an non-patterned conductive layer 36. Then, an insulating layer 34 is formed between the conductive material layers. Namely, the conductive layers 36 are formed only on one side of the FPC 30 (on the signal wire 32).

(b) There are three conductive material layers in the FPC: the center layer is composed of a signal wire 32 and an insulating member 33; and the external layers are non-patterned conductive layers 36. Then, insulating layers 34 and 35 are formed between those conductive material layers, respectively.

(c) A pair of non-patterned conductive layers 36 described in the above FPC (b) are connected by a via hole 38 (see FIG. 4).

(d) A reticulated conductive layer is formed instead of the conductive layer 36 described in the above FPC (a) through (c) (this offers more flexibility of the FPC, thereby improving workability).

(e) A copper tape, for example, is stuck or coiled on insulating layers 34 and 35 of the FPC to form a conductive layer 36.

(f) A conductive layer 36 is formed on insulating layers 34 and 35 of the FPC by a vapor deposition, sputtering, or ion-plating method using a conductive substance such as copper or aluminum.

(g) A conductive material such as a silver paste is coated on insulating layers 34 and 35 of the FPC to form a conductive layer 36.

In such a FPC 30, the conductive layer 36, the holding board 16 having conductivity, and the conductive shielding case 20 are electrically connected to one another by the connecting means 50a and 50b provided aside from the connecting means 22, as shown in FIG. 7. For example, if a contact finger is used as the connecting means 50a and 50b, the holding board 16 and the conductive shielding case 20 can be connected to each other by attaching the contact finger to the holding board 16 and the conductive shielding case 20, respectively, and then connecting those contact fingers to the conductive layer 36. Moreover, in order to force the conductive layer 36 to have a ground potential, a so-called rigid flexible substrate formed by integrating the FPC 30 and the drive circuit substrate 12 into one unit may be employed, so that the conductive layer 36 is grounded through the drive circuit substrate 12.

Figure 8:
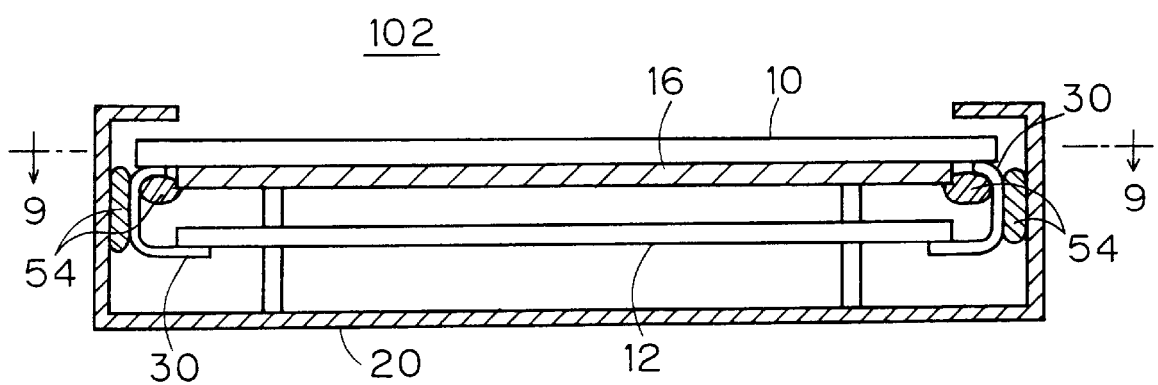
FIG. 8 is a sectional view roughly showing the other structure of the display device according to the second preferred embodiment.
Figure 9:
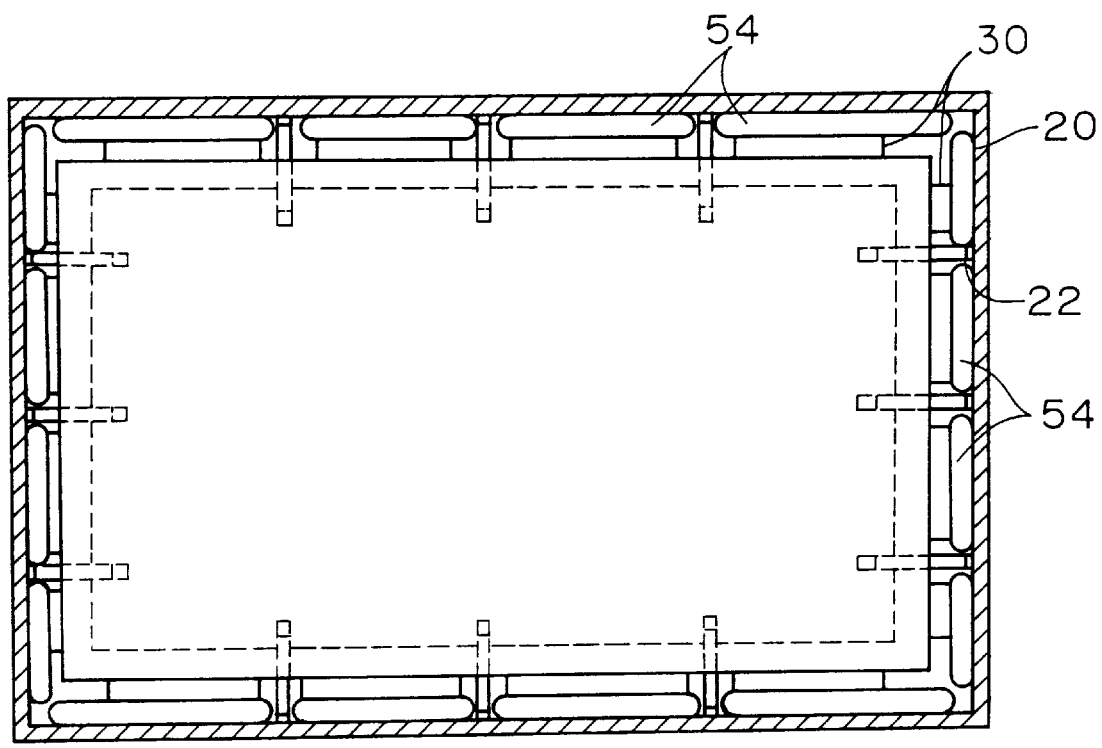
FIG. 9 is a sectional view taken along a line 9—9 in FIG. 8.

FIG. 8 is a sectional view roughly showing a structure of a display device 102 which is a modification according to this preferred embodiment; and FIG. 9 is a sectional view taken along a line 9—9 in FIG. 8. A variable-shape member 54 having conductivity at least on the surface thereof, such as a sponge with a conductive material thereon or a sponged member having conductivity in itself, may be inserted between the FPC 30 and the conductive shielding case 20, and/or between the FPC 30 and the holding board 16, as shown in FIGS. 8 and 9, to connect them electrically. Especially, if inserted between the conductive shield case 20 and the FPC 30, as shown in FIG. 9, the conductive variable-shape member 54 fills a gap of the shield composed of the conductive holding board 16, the conductive shielding case 20, and the connecting means 22. Thus, a more reliable electromagnetic shield can be obtained. Further, even if distances between the FPC 30, the holding board 16, and the conductive shielding case 20 are somewhat changed due to shock or deflection, the variable-shape member 54 can be adapted to the change in distance because of its flexibility in shape. Thus, the FPC 30, the holding board 16, and the conductive shielding case 20 can be electrically connected to one another for sure. The variable-shape member 54 may be a commercially available shielding member against the EMI.

The FPC 30 may be substituted by other connecting means such as a FFC (flexible flat cable) or a flat cable. Further, although the conductive layer 36 is forced to have a ground potential in the foregoing description, the same effect can be obtained as long as the conductive layer 36 is forced to have a constant potential.

3. Third Preferred Embodiment

For the power or signal wire extracted to the outside of the conductive shielding case 20, it is desirable to provide a noise filter 42 at the input and output portion thereof as shown in FIG. 6, so as to prevent leakage of noise to the outside. A third preferred embodiment will describe a structure further improving noise shield effect obtained in the second preferred embodiment, with reference to FIGS. 10 and 11.

Figure 10A:
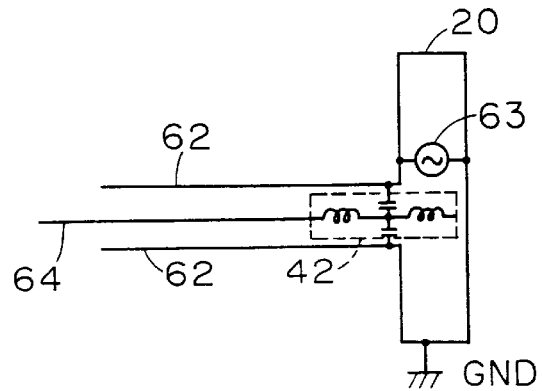
FIGS. 10A through 10C are diagrams illustrating an electrical relationship of the display device and external wiring according to a third preferred embodiment of the present invention.
Figure 10B:
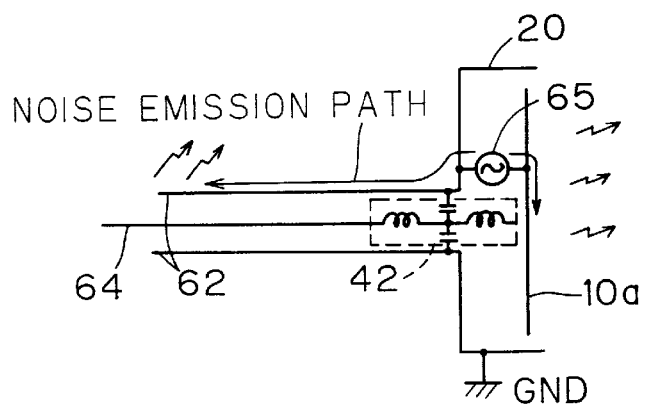
Figure 10C:
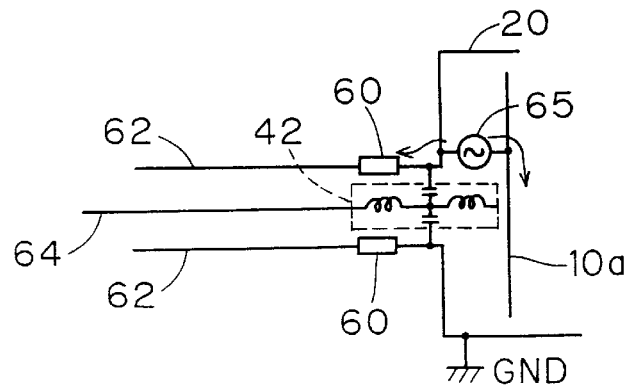

In the third preferred embodiment, in addition to the structure of the second preferred embodiment, a noise filter 42 is provided at the input and output portion of any power and signal wire 64 extending to the outside of the conductive shielding case 20, and a noise filter 60 is provided as an inductance component at the input and output portion of each ground wire 62 for covering the wire 64, which is shown in FIG. 10C.

As a measure against the EMI, the noise filter 42 is generally inserted into the power and signal wire 64 extracting from the conductive shielding case 20 to the outside, as shown in FIGS. 6 and 10A. A noise emitted through the power and signal wire 64 to the outside is drained to ground by the noise filter 42. Thus, if the conductive shielding case 20 is completely closed to a noise source 63, a path through which noise is emitted to the outside, including the conductive shielding case 20 and other external wires, can be shielded. This gives high noise shield effect. In the display device, however, it is impossible to completely cover the display surface as described above because of the opening portion 20a exposing the display surface 10a. Thus, in some cases, only the noise filter 42 is not enough to obtain sufficient noise shield effect, unlike the conductive shielding case having a completely closed noise emission mechanism.

Here, a noise emission path from the noise source to the outside is indicated by an arrow in FIG. 10B. A high-frequency noise slightly leaking to the side of the display surface 10a of the panel 10 from the noise source 65 is emitted by an equivalent antenna which regards the display surface 1a as one pole, and the conductive shielding case 20 and the external wires extracted therefrom as the other.

To suppress this emission, it is not effective only to insert the noise filter 42 thereby to discharge noise into the ground wire. Thus, it is necessary to avoid emission of noise into the ground wire 62 so as to reduce efficiency of the antenna.

Therefore, in the third preferred embodiment, the noise filter 60 is inserted into the input and output portion of the ground wire 62 as shown in FIG. 10C to ensure an electromagnetic shield.

Figure 11A:
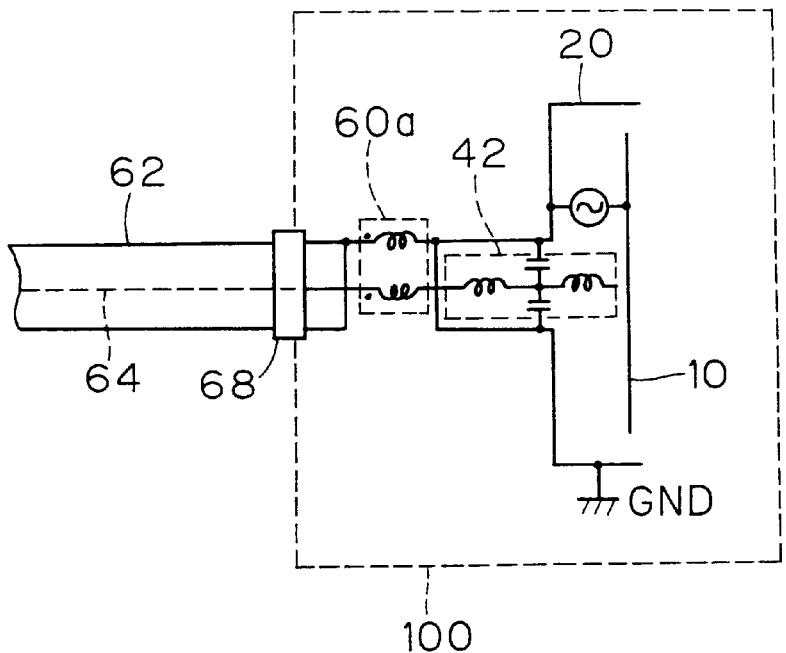
FIGS. 11A and 11B are diagrams illustrating the display device according to the third preferred embodiment.
Figure 11B:
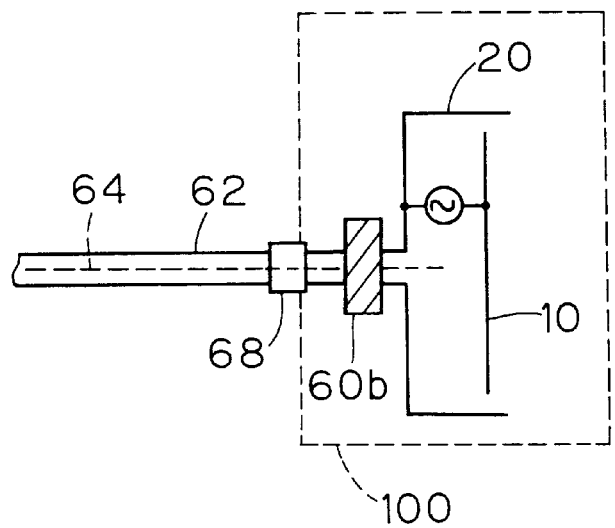

The noise filter 60 may be, for example as shown in FIG. 11A, a choke coil 60a, such as a common-mode choke coil, inserted between the connector 68 connected to the ground wire 62 and the external wire 64, and the noise filter 42. Alternatively, as shown in FIG. 11B, a ferrite core 60b may be inserted between the connector 68 connected to the ground wire 62 and the external wire 64, and the conductive shielding case 20, to provide an inductance component to the ground wire 62 and the power and signal wire 64.

As described above, while the noise filter 42 is inserted into all the paths of the power and signal wire 64 extending from the conductive shielding case 20 to the outside, an inductance component is inserted into a wiring path of the ground wire 62 for electromagnetically shielding the power and signal wire 64. This further reliably prevents leakage of noise due to the external wire.

4. Fourth Preferred Embodiment

Figure 12:
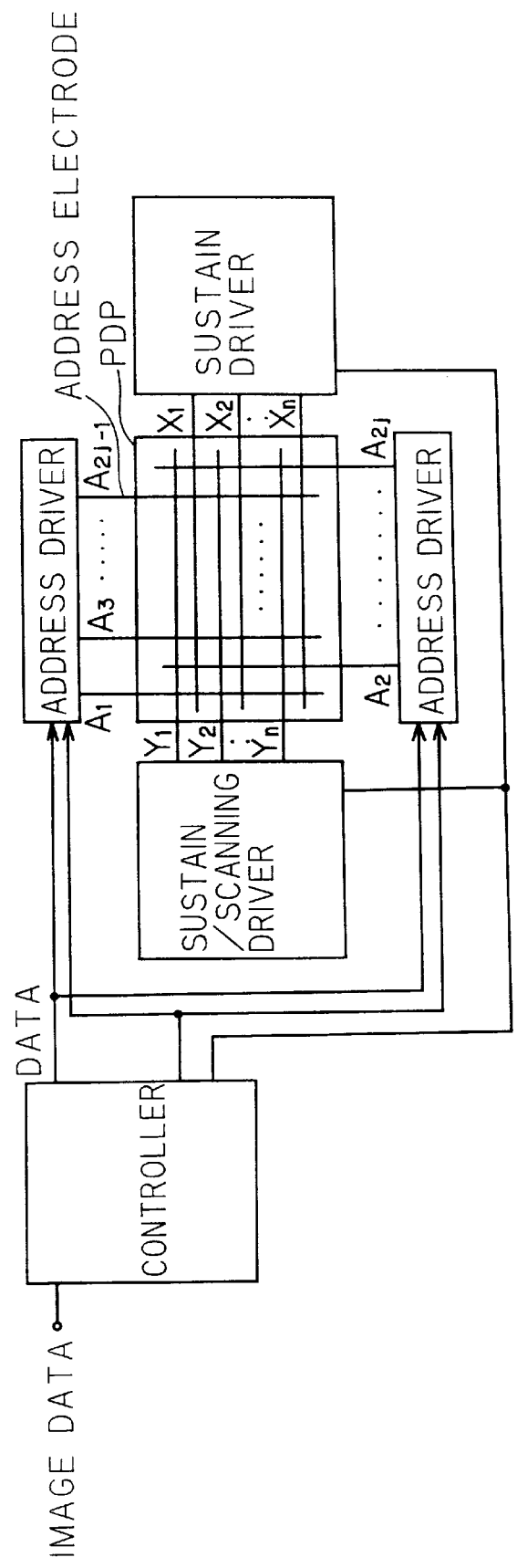
FIG. 12 roughly shows a structure of a surface-discharge AC type PDP.
Figure 13:
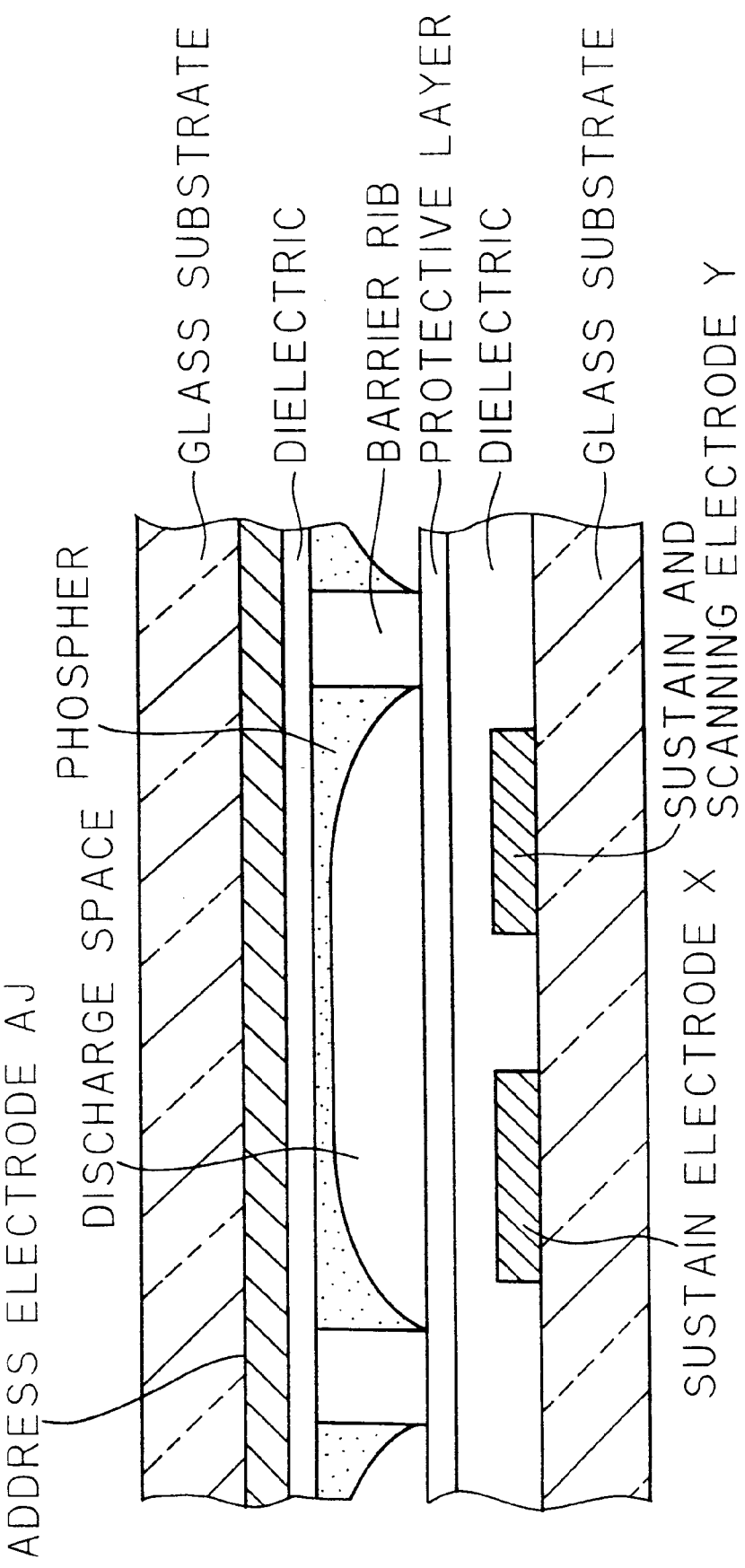
FIG. 13 shows a sectional structure of the PDP.

FIG. 12 roughly shows a structure of a surface discharge AC type PDP, and FIG. 13 shows a sectional structure of the PDP. In the PDP, a plurality of discharge cells are formed in a matrix between a pair of glass substrates. Each of the discharge cells is formed at an intersection of an address electrode formed on one of the glass substrates, and a pair of sustain electrodes (a sustain electrode X, and a sustain and scanning electrode Y) formed on the other of the glass substrates and extending in an orthogonal direction to an address electrode. Then, an address pulse and a scanning pulse are applied at the same time to address electrodes $A_1$ through $A_j$ and a sustain and scanning electrode Y, respectively, to select a discharge cell at the intersection, and the selected discharge cell produces a discharge to accumulate wall charge. After the wall charge is accumulated, sustain pulses are alternatively applied to the sustain and scanning electrode Y and the sustain electrode X so as to reverse polarity. This produces a sustain discharge between the sustain and scanning electrode Y and the sustain electrode X, thereby keeping discharge. A phosphor is excited by an ultraviolet ray generated by discharge of each discharge cell and then produces a visual light. This is the image display.

In such a PDP, the electrodes formed on the respective glass panels are strongly combined with each other by a static capacitance, so that each substrate can be considered as one electrode surface at a frequency in an RF region. Thus, the output voltage from the noise source 65 shown in FIG. 10B can be considered to be an average of the voltages applied to the respective electrodes on the substrate.

Here, having the largest energy among the driving pulses of the PDP are the sustain pulses alternatively applied to the sustain electrode X and the sustain and scanning electrode Y. Namely, if an instantaneous average value of the sustain pulses becomes constant during a sustained discharge period, energy of the high-frequency component to be a source of noise, shown in FIG. 10B, is reduced. This reduces emission of noise.

Therefore, in a fourth preferred embodiment, the average value of the sustain pulses alternatively applied to the sustain electrode X and the sustain and scanning electrode Y is set so as to be almost constant at all the electrodes X and Y during the sustained discharge period.

Figure 14A:
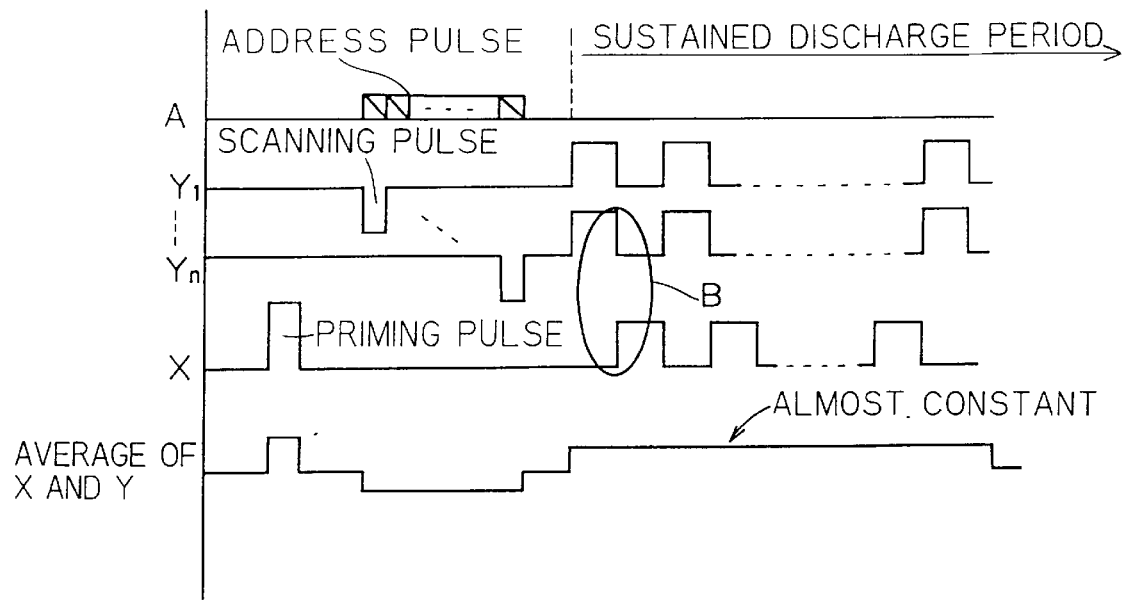
FIGS. 14A and 14B show driving waveforms of the PDP according to a fourth preferred embodiment of the present invention.

FIG. 14A shows a driving waveform of the PDP according to the fourth preferred embodiment. In the PDP, a priming pulse applied first to the sustain electrode X, or common electrode, causes write discharge in all cells. Next, an address pulse is applied to the address electrode and a scanning pulse sequentially to the sustain and scanning electrodes $Y_1$ to $Y_n$ which are individual electrodes, to accumulate wall charge in a discharge cell at their intersection. During the sustained discharge period, the sustain pulses are alternately applied to all of the sustain and scanning electrodes $Y_1$ to $Y_n$ and the sustain electrode X. In the conventional art, the sustain pulse to be applied to either of the sustain electrode X or the sustain and scanning electrodes Y falls and then the sustain pulse to be applied to the other of the sustain electrode X or the sustain and scanning electrodes Y rises. Thus, the average value of the voltages across the substrate varies widely each time the sustain pulses are applied to the sustain electrode X and the sustain and scanning electrodes Y. This may be the cause of noise.

Figure 14B:
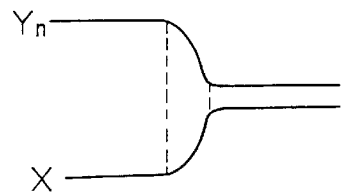

In this invention, in FIG. 14A, the rise timing of the sustain pulse at the sustain electrode X corresponds to fall timing of the sustain pulse at the sustain and scanning electrodes Y, and the fall timing of the sustain pulse at the sustain electrode X corresponds to the rise timing of the sustain pulse at the sustain and scanning electrodes Y. FIG. 14B is an enlarged view of a portion B in FIG. 14A. The rise or fall timing is set so that the rise period almost agrees with the fall period. This agreement between the rise timing and the fall timing of the sustain pulses applied to the sustain electrode X and the sustain and scanning electrodes Y allows the instantaneous average voltage to be almost constant at the sustain electrode X and the sustain and scanning electrodes Y during the sustained discharge period as shown in the figure. Since the same sustain pulse is simultaneously applied to the respective sustain and scanning electrodes Y on the substrate during the sustained discharge period, it is almost unnecessary to provide a particular structure in the driving circuit even if the timing of applying the sustain pulse to the common sustain electrode X and each of the sustain and scanning electrodes Y is set as shown in FIGS. 14A and 14B.

Figure 15:
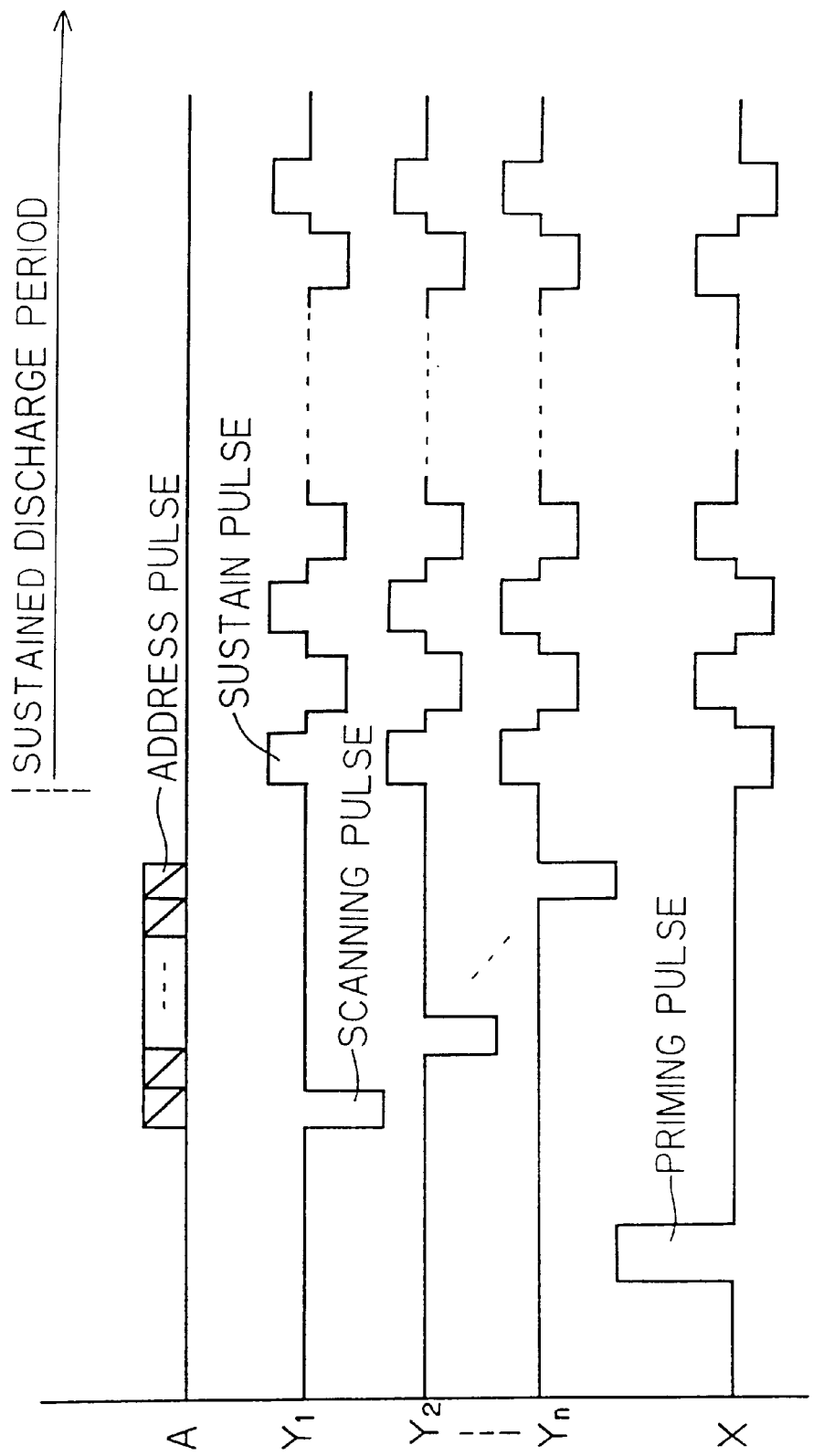
FIG. 15 shows another driving waveform of the PDP according to the fourth preferred embodiment.
Figure 16:
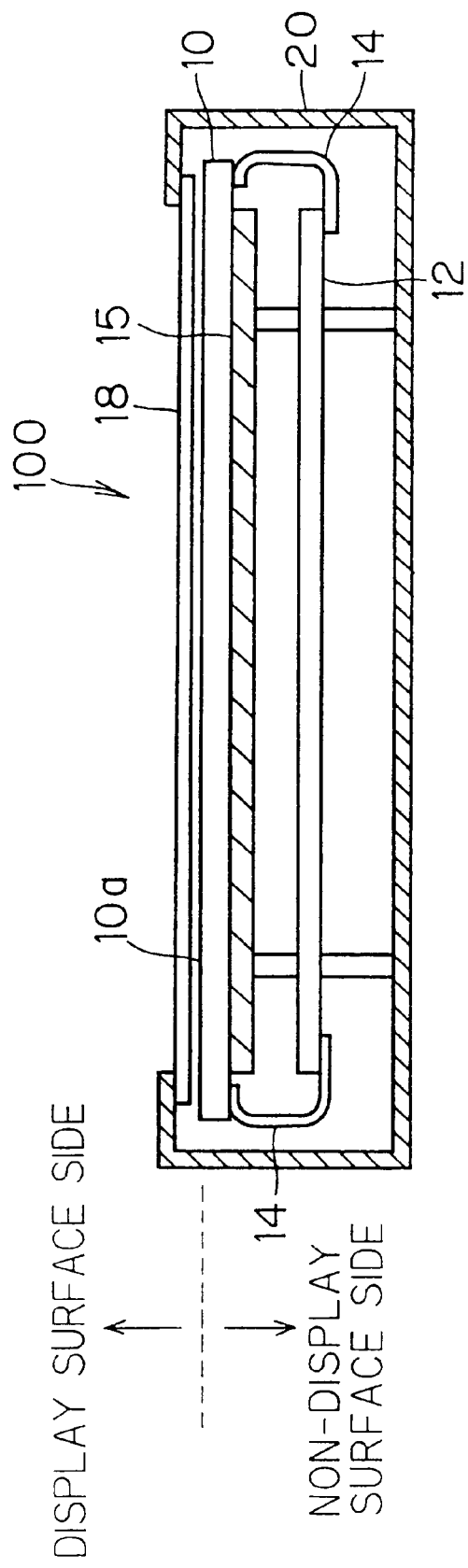
FIG. 16 is a sectional view roughly showing a structure of a conventional display device.

FIG. 15 shows another driving waveform for averaging the instantaneous average voltages between the sustain electrode X and the sustain and scanning electrodes Y during the sustained discharge period. While being a rectangle wave, that is, a binary pulse in the example shown in FIG. 14, the sustain pulses to be alternately applied to the sustain electrode X and the sustain and scanning electrodes Y in FIG. 15 are multiple pulse (ternary pulse, for example). Like FIG. 14B, the rise or fall timing of the multiple pulse at the sustain electrode X corresponds to that at the sustain and scanning electrodes Y, which allows the instantaneous average voltages between the sustain electrode X and the sustain and scanning electrodes Y to be constant.

The use of the multiple pulse as the sustain pulses makes it possible to reduce a rapid change in the instantaneous average voltage at the sustain electrode X and the sustain and scanning electrodes Y even if the rise or fall timing, is somewhat delayed. Since a rapid change in the voltage value is likely to cause a high-frequency noise, the use of the multiple pulse as the sustain pulse as shown in FIG. 15 more reliably prevents generation of high-frequency noise.

As described above, by driving so as to make the instantaneous average voltage constant at all of the sustain electrode X and the sustain and scanning electrodes Y during the sustained discharge period, the energy of the high-frequency component to be a source of noise can be equivalently reduced, which reduces emission of noise. Further, by employing the driving method of the fourth preferred embodiment in the structure for an electromagnetic shield as described in the foregoing preferred embodiments, capability of the display device in shielding an electromagnetic wave can be further improved.

While the invention has been described in detail, the foregoing description is in all aspects illustrative and not restrictive. It is understood that numerous other modifications and variations can be devised without departing from the scope of the invention.

What is claimed is:

1. A display device having a display panel with a plurality of pixels formed between a pair of substrates and giving a desired display by controlling each of said pixels, said display device comprising:

a conductive shielding case with said display panel and a drive circuit for driving said display panel disposes therein, said conductive shielding case having an opening at the side of said display panel;

a conductive member disposed between said drive circuit and said display panel, wherein said drive circuit is disposed at a non-display surface of said display panel formed within said conductive shielding case;

said conductive member and said conductive shielding case are connected to provide an electromagnetic shield to said drive circuit;

a conductive portion having a ground potential; and a signal wire electrically connecting said drive circuit and said display panel;

wherein said conductive portion and said signal wire form a static capacitance that drains at least a portion of a high-frequency noise from said drive circuit.

2. The display device according to claim 1, further comprising:

an insulating layer formed on said signal wire; and a conductive layer formed on said insulating layer, wherein said conductive layer is forced to have a ground potential.

3. The display device according to claim 2, further comprising:

a connection between said conductive layer and said conductive shielding case so that said conductive layer is forced to have a ground potential.

4. The display device according to claim 2, further comprising:

a noise filter inserted into paths of a power wire and a signal wire extracted from said drive circuit to the outside of said conductive shielding case, and an inductance component added to a grounded wiring path for electromagnetically shielding each of said power wire and said signal wire.

5. The display device according to claim 2, further comprising:

a transparent conductive layer formed on a display surface of said display panel, said transparent conductive layer being connected to said conductive shielding case.

6. The display device according to claim 1, further comprising:

insulating layers covering top and bottom surfaces of said signal wire, respectively; and conductive layers formed on each of said insulating layers, wherein said conductive layer is forced to have a ground potential.

7. The display device according to claim 6, further comprising:

a resilient member having conductivity at least on the surface thereof and deposited at least between said conductive layer and said conductive shielding case, wherein said conductive member and said conductive shielding case are electrically connected with said resilient member.

8. The display device according to claim 7 further comprising:

a transparent conductive layer formed on a display surface of said display panel, said transparent conductive layer being connected to said conductive shielding case.

9. The display device according to claim 6, further comprising:

a transparent conductive layer formed on a display surface of said display panel, said transparent conductive layer being connected to said conductive shielding case.

10. The display device according to claim 1, further comprising:

insulating layers covering top and bottom surfaces of said signal wire, respectively; and conductive layers formed on each of said insulating layers, wherein one of said conductive layers, disposed at the side of said conductive member disposed between said drive circuit and said display panel, is connected to said conductive member, while the other disposed at the side of said conductive shielding case is connected to said conductive shielding case.

11. The display device according to claim 10 further comprising:

a resilient member having conductivity at least on the surface thereof and deposited at least between said conductive layer and said conductive shielding case, wherein said conductive member and said conductive shielding case are electrically connected with said resilient member.

12. The display device according to claim 1, further comprising:

a transparent conductive layer formed on a display surface of said display panel, said transparent conductive layer being connected to said conductive shielding case.

13. A display device having a display panel with a plurality of pixels formed between a pair of substrates and giving a desired display by controlling each of said pixels, said display device comprising:

a conductive shielding case with said display panel and said drive circuit for driving said display panel disposes therein, said conductive shielding case having an opening at the side of said display panel;

a conductive member disposed between said drive circuit and said display panel, wherein said drive circuit is disposed at a non-display surface of said display panel formed within said conductive shielding case;

said conductive member and said conductive shielding case are connected to provide an electromagnetic shield to said drive circuit;

a noise filter inserted into paths of a power wire and a signal wire extracted from said drive circuit to the outside of said conductive shielding case; and an inductance component added to a grounded wiring path for electromagnetically shielding each of said power wire and said signal wire.

14. The display device according to claim 13 further comprising:

a transparent conductive layer formed on a display surface of said display panel, said transparent conductive layer being connected to said conductive shielding case.

15. The display device according to claim 1, further comprising:

a noise filter inserted into paths of a power wire and a signal wire extracted from said driver circuit to the outside of said conductive shielding case; and an inductance component added to a grounded wiring path for electromagnetically shielding each of said power wire and said signal wire.

16. The display device according to claim 1, further comprising:

connection means between the conductive member and the conductive shielding case utilizing a connection pitch of less than one sixth of a wavelength of a frequency band utilized by the drive circuit.

* * * * *